United States Patent
Miyaba et al.

(10) Patent No.: US 8,063,745 B2
(45) Date of Patent: Nov. 22, 2011

(54) AIR CONDITIONER AND ADDRESS SETTING METHOD IN AIR CONDITIONER

(75) Inventors: Yasuaki Miyaba, Osaka (JP); Tooru Kubo, Osaka (JP); Hisashi Sumida, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 714 days.

(21) Appl. No.: 12/224,127

(22) PCT Filed: Mar. 7, 2007

(86) PCT No.: PCT/JP2007/054436
§ 371 (c)(1),
(2), (4) Date: Aug. 19, 2008

(87) PCT Pub. No.: WO2007/102542
PCT Pub. Date: Sep. 13, 2007

(65) Prior Publication Data
US 2009/0118867 A1    May 7, 2009

(30) Foreign Application Priority Data
Mar. 9, 2006   (JP) ................................ 2006-064434

(51) Int. Cl.
*H04Q 5/22* (2006.01)
*F25B 7/00* (2006.01)
(52) U.S. Cl. ........................................ 340/10.2; 62/175
(58) Field of Classification Search ................. 340/10.2, 340/3.4, 12, 825.18, 12.1–12.55, 4.1–4.44, 340/1.1, 3.5, 3.53–3.55, 9.1, 9.11, 9.16, 504, 340/505; 62/175; 700/276–278; 341/176; 714/749
See application file for complete search history.

(56) References Cited

U.S. PATENT DOCUMENTS

| | | | | |
|---|---|---|---|---|
| 4,947,162 A | * | 8/1990 | Kimura ........................ | 340/3.51 |
| 5,390,506 A | * | 2/1995 | Sogabe et al. .................. | 62/175 |
| 5,499,510 A | * | 3/1996 | Yoshida et al. ................. | 62/175 |
| 5,554,979 A | * | 9/1996 | Kohar et al. ............... | 340/12.53 |

(Continued)

FOREIGN PATENT DOCUMENTS

JP         5-164385 A       6/1993

(Continued)

OTHER PUBLICATIONS

Korean Decision to Grant a Patent, dated Oct. 7, 2010, for Application No. 10-2008-7021872.

*Primary Examiner* — Daniel Wu
*Assistant Examiner* — Mohamed Barakat
(74) *Attorney, Agent, or Firm* — Birch, Stewart, Kolasch & Birch, LLP (57) ABSTRACT

A serial number detection portion simultaneously transmits a detection command for requesting a first digit of a serial number to plurality of indoor units, and the serial number detection portion simultaneously transmits a detection command for requesting a second digit immediately preceding the first digit to the indoor units when a response to the detection command is absent. That is, the address setting is performed again from the immediately preceding digit without returning to an initial digit of the serial number, so that the time necessary for the address setting can be shortened. When the address setting is performed again from the immediately preceding digit, the address setting can be performed more securely by changing a method of recognizing the detection command in the indoor units.

16 Claims, 7 Drawing Sheets

U.S. PATENT DOCUMENTS

| | | | | |
|---|---|---|---|---|
| 5,592,824 | A * | 1/1997 | Sogabe et al. | 62/127 |
| 5,743,101 | A * | 4/1998 | Shida et al. | 62/175 |
| 6,622,501 | B2 * | 9/2003 | Seong | 62/175 |
| 6,644,050 | B2 * | 11/2003 | Shim | 62/175 |
| 6,969,565 | B2 * | 11/2005 | Hara et al. | 429/457 |
| 7,084,742 | B2 * | 8/2006 | Haines | 340/12.33 |
| 7,735,328 | B2 * | 6/2010 | Kim et al. | 62/127 |

FOREIGN PATENT DOCUMENTS

| | | |
|---|---|---|
| JP | 6-181592 A | 6/1994 |
| JP | 9-196443 A | 7/1997 |
| JP | 9-257295 A | 9/1997 |
| JP | 2000-74461 A | 3/2000 |
| JP | 2000-88321 A | 3/2000 |
| JP | 2003-227644 A | 8/2003 |

* cited by examiner

AIR CONDITIONER AND ADDRESS SETTING METHOD IN AIR CONDITIONER

TECHNICAL FIELD

The present invention relates to an air conditioner and an address setting method in the air conditioner, particularly to a technique of setting addresses in plurality of indoor units.

BACKGROUND ART

In the case where one outdoor unit controls plurality of indoor units, it is necessary that addresses be set at the indoor units in order to transmit a control signal. The same holds true for the case in which one remote controller transmits the control signal to the plurality of indoor units.

In the conventional air conditioner, the outdoor unit or the remote controller requests a unique serial number of each indoor unit in each digit, the indoor unit responds to a number of the requesting digit, to detect the serial number, and the address setting is performed to the indoor unit having the serial number.

During the address setting, when the address setting is not normally performed because the indoor unit cannot normally receive a command for requesting a predetermined digit of the serial number due to a noise or ringing or the like, the address setting starts over by returning to the initial digit to detect the serial number again. For example, Patent Documents 1 to 3 disclose a technique concerning the address setting of the air conditioner.

Patent Document 4 also discloses a technique of preventing reception failure caused by the noise. In the technique disclosed in Patent Document 4, a whole time and a low time of a pulse signal are detected, and the whole time and the low time are compared to reference times to detect a start bit signal.

Patent Document 1: Japanese Patent Application Laid-Open No. 9-196443
Patent Document 2: Japanese Patent Application Laid-Open No. 9-257295
Patent Document 3: Japanese Patent Application Laid-Open No. 2000-74461
Patent Document 4: Japanese Patent Application Laid-Open No. 6-181592

DISCLOSURE OF THE INVENTION

Problems to be Solved by the Invention

However, in the conventional air conditioner, there is a problem that when the reception failure is generated by signal disturbance such as the noise or ringing during the address setting, because the address setting starts over by returning to the initial digit, it takes a long time to perform the address setting. There is a problem that in the case where the signal disturbance is continuously generated, because the similar reception failure is generated during the retry of the address setting, the address setting cannot be performed.

An object of the present invention is to provide an air conditioner which can shorten a time necessary for the address setting and more securely perform the address setting.

A first aspect of an air conditioner according to the present invention is an air conditioner (100) in which one control portion (10,30) and plurality of indoor units (21 to 24) are connected to each other through a communication line (40, 50) and running is controlled by conducting communication between the control portion and the plurality of indoor units based on a communication address corresponding to each of the plurality of indoor units, wherein each of the plurality of indoor units includes a transmitting and receiving portion which receives detection commands each of which requests a different one of digits of a unique identification number to each of the communication line and transmits a response including the one of digits of the identification number corresponding to each of the detection commands through the communication line, the control portion includes: an identification number detection portion (11a) which transmits the detection commands to the plurality of indoor units in a predetermined order while a position of the one of digits is changed and detects the identification number; when no response to a first of the detection commands is received, the identification number detection portion simultaneously transmits a second of the detection commands based on the predetermined order to the plurality of indoor units; and an address setting portion (11b) which imparts the communication address to one of the plurality of indoor units having the identification number detected by the identification number detection portion.

A second aspect of an air conditioner according to the present invention is the air conditioner according to the first aspect, wherein the identification number detection portion simultaneously transmits the same first of the detection commands to the plurality of indoor units a predetermined number of times repeatedly, and the identification number detection portion simultaneously transmits the second of the detection commands to the plurality of indoor units, when no response to every first of the detection commands is received.

A third aspect of an air conditioner according to the present invention is the air conditioner according to the first or second aspect, wherein the control portion further includes a setting changing portion (11c) which simultaneously transmits a changing command for changing a method of recognizing the detection commands to the plurality of indoor units.

A fourth aspect of an air conditioner according to the present invention is the air conditioner according to the third aspect, wherein the control portion further includes a setting changing portion which simultaneously transmits the changing command for changing the method of recognizing the detection commands to the plurality of indoor units when no response to every first of the detection commands is received, and then the identification number detection portion simultaneously transmits the second of the detection commands to the plurality of indoor units.

A fifth aspect of an air conditioner according to the present invention is the air conditioner according to the third aspect, wherein the control portion further includes a setting changing portion which simultaneously transmits the changing command for changing the method of recognizing the detection commands to the plurality of indoor units only when the second of the detection commands is an initial one in the predetermined order and, at the same time, when no response to every first detection commands is received, and then the identification number detection portion simultaneously transmits the second of the detection commands to the plurality of indoor units.

A sixth aspect of an air conditioner according to the present invention is the air conditioner according to any one of the third to fifth aspects, wherein changing the method of recognizing the detection commands is that temporal resolution in which a width of an active period is detected is decreased, the width of the active period becoming a reference of presence or absence of a start bit signal indicating a data start position of each of the detection commands.

A first aspect of an address setting method in an air conditioner according to the present invention is an address setting method in an air conditioner (100) in which one control portion (10,30) and a plurality of indoor units (21 to 24) are connected to each other through a communication line (40, 50) and running is controlled by conducting communication between the control portion and the plurality of indoor units based on a communication address corresponding to each of the plurality of indoor units; each of the plurality of indoor units includes a transmitting and receiving portion which receives detection commands each of which requests a difficult one of digits of a unique identification number to each of the plurality of indoor units from the control portion through the communication line and transmits a response including the one of digits of the identification number corresponding to each of the detection commands through the communication line, and the control portion includes: an identification number detection portion (11a) which transmits the detection commands to the plurality of indoor units in a predetermined order while a position of the one of digits is changed and detects the identification number; and an address setting portion (11b) which imparts the communication address to one of the plurality of indoor units having the identification number detected by the identification number detection portion, and the identification number detection portion performs: (a) a step of simultaneously transmitting a first of the detection commands to the plurality of indoor units, and (b) a step of simultaneously transmitting a second of the detection commands immediately preceding the first of said detection commands based on the predetermined order to said plurality of indoor units, when no response to the first of the detection commands is received.

A second aspect of an address setting method in an air conditioner according to the present invention is the address setting method in the air conditioner according to the first aspect, wherein the step (a) is a step of simultaneously transmitting the same first of the detection commands to the plurality of indoor units a predetermined number of times repeatedly, and the step (b) is a step of simultaneously transmitting the second of the detection commands to the plurality of indoor units, when no response to every first of the detection commands is received.

A third aspect of an address setting method in an air conditioner according to the present invention is the address setting method in the air conditioner according to the first or second aspect, wherein the control portion further performs a step (c-1) between the step (a) and the step (b), in the step (c-1) a changing command for changing a method of recognizing the detection commands is simultaneously transmitted to the plurality of indoor units when no response to every first of the detection commands is received.

A fourth aspect of an address setting method in an air conditioner according to the present invention is the address setting method in the air conditioner according to the first or second aspect, wherein the control portion further performs a step (c-2) between the step (a) and the step (b), in the step (c-2) a changing command for changing a method of recognizing the detection commands is simultaneously transmitted to the plurality of indoor units, only when the second of the detection commands is an initial one in the predetermined order and, at the same time, when no response to every first detection commands is received.

A fifth aspect of an address setting method in an air conditioner according to the present invention is the address setting method in the air conditioner according to the third or fourth aspect, wherein, in the step (c-1) or in the step (c-2), changing the method of recognizing the detection commands is that temporal resolution in which a width of an active period is detected is decreased, the width of the active period becoming a reference of presence or absence of a start bit signal indicating a data start position of each of the detection commands.

EFFECT OF THE INVENTION

In the first aspect of the air conditioner according to the present invention or the first aspect of the address setting method in the air conditioner according to the present invention, the time for performing the address setting again which is generated by the reception failure of the detection command in the indoor unit can be shortened.

In the second aspect of the air conditioner according to the present invention or the second aspect of the address setting method in the air conditioner according to the present invention, the same detection command is transmitted to perform the address setting again in response to no replay of the indoor unit, so that the time for performing the address setting again can be shortened.

In the third aspect of the air conditioner according to the present invention, the indoor unit easily recognizes the detection command, so that the address setting can more securely be performed.

In the fourth aspect of the air conditioner according to the present invention or the third aspect of the address setting method in the air conditioner according to the present invention, the indoor unit easily recognizes the detection command, so that the address setting can more securely be performed again.

In the fifth aspect of the air conditioner according to the present invention or the fourth aspect of the address setting method in the air conditioner according to the present invention, the address setting can more securely be performed again.

In the sixth aspect of the air conditioner according to the present invention or the fifth aspect of the address setting method in the air conditioner according to the present invention, the address setting can be performed while avoiding the reception failure of the detection command caused by the noise or ringing of the start bit signal.

Other objects, features, aspects, and advantages of the present invention will become more apparent by the following detailed description and the accompanying drawings.

BEST MODE FOR CARRYING OUT THE INVENTION

First Embodiment

Figure 1:
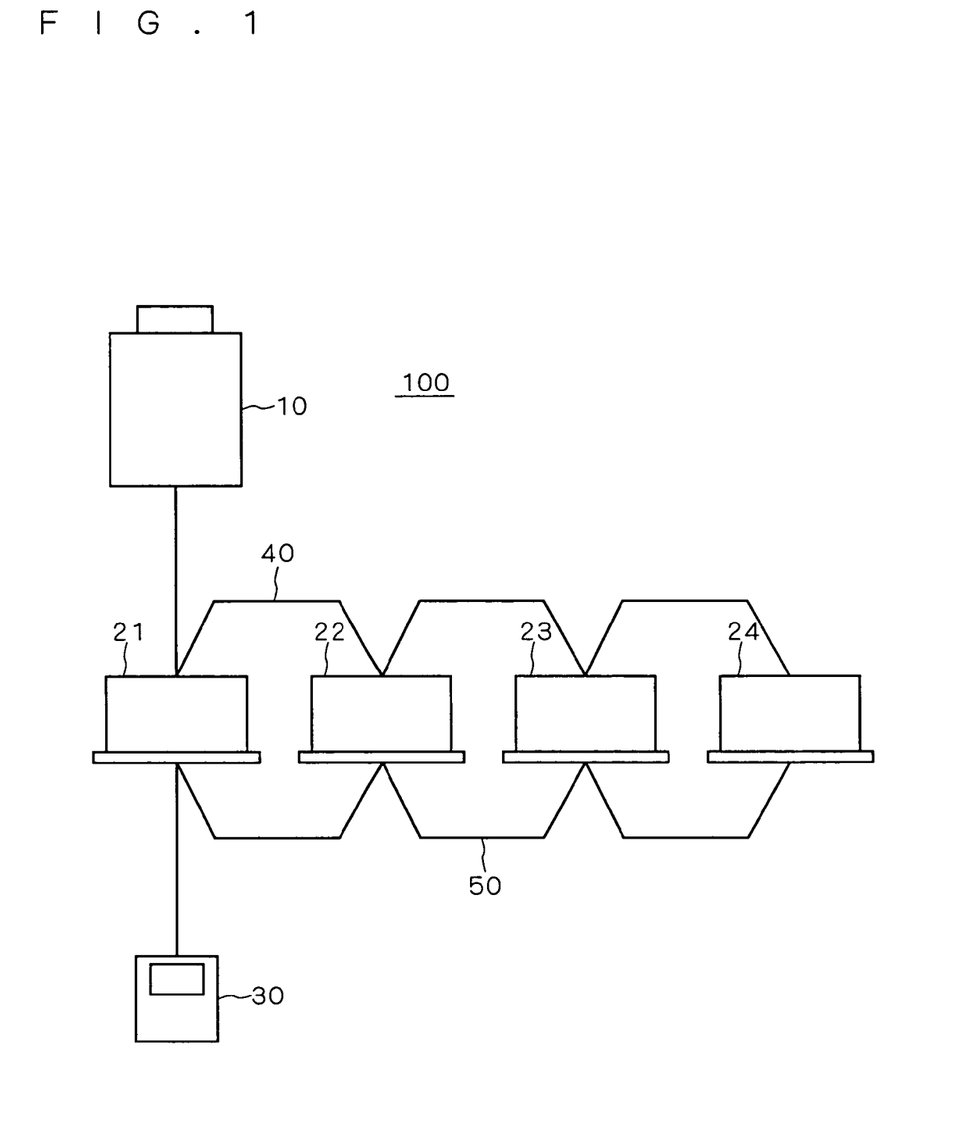
FIG. 1 is a view showing a schematic configuration of an air conditioner according to the present invention.

FIG. 1 is a view showing a schematic configuration of an air conditioner according to a first embodiment of the present invention. An air conditioner 100 of the first embodiment includes one outdoor unit 10, plurality of indoor units 21 to 24, and a remote controller 30. The outdoor unit 10 can mutually conduct communication with the indoor units 21 to 24 through communication line 40, and the remote controller 30 can mutually conduct communication with the indoor units 21 to 24 through communication line 50.

It is necessary that the outdoor unit 10 transmits and receives a control signal for controlling an operation of a compressor or a fan to each of the plurality of indoor units 21 to 24 during ordinary running. Therefore, address setting in which a communication address is imparted to each indoor unit is automatically performed prior to the ordinary running.

It is also necessary that the remote controller 30 transmits a control signal for controlling a wind direction to each of the plurality of indoor units 21 to 24 during the ordinary running. Therefore, the address setting in which the communication address is imparted to each indoor unit is automatically performed prior to the ordinary running. Because the descriptions of the address settings performed by the remote controller 30 and outdoor unit 10 overlap each other, the address setting performed by the outdoor unit 10 will be described in the first embodiment.

Figure 2:
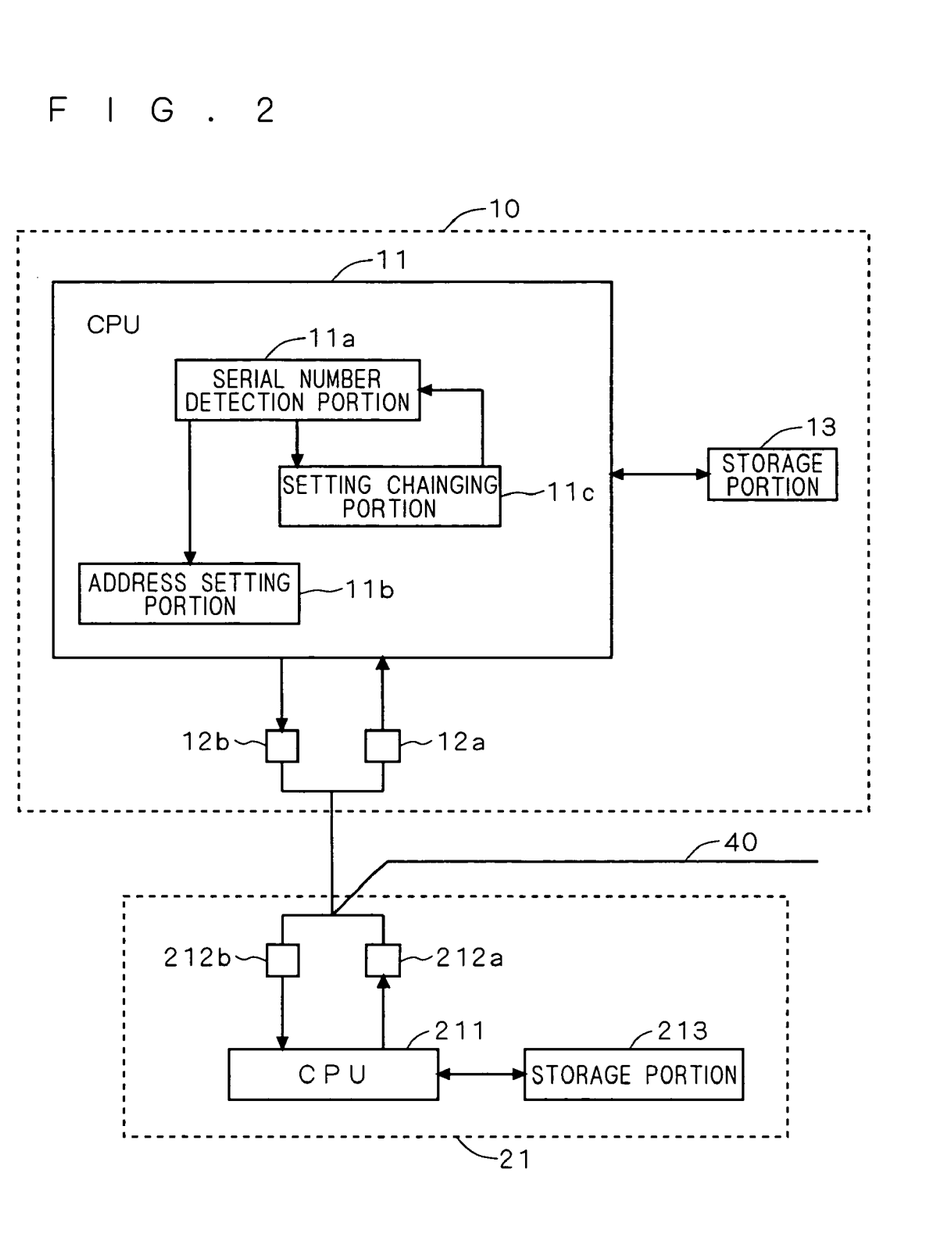
FIG. 2 is a schematic view showing internal mechanisms of an outdoor unit and an indoor unit of FIG. 1.

FIG. 2 is a schematic view showing internal mechanisms of the outdoor unit 10 and the indoor unit 21 of FIG. 1. The outdoor unit 10 includes a CPU 11, a storage portion 13, a transmitting portion 12b, and a receiving portion 12a. The indoor unit 21 includes a CPU 211, a storage portion 213, a transmitting portion 212a, and a receiving portion 212b.

The unique serial number (identification number) imparted to the outdoor unit or each indoor unit during production or the communication address set for conducting communication are stored in the recording portions 13 and 213. The CPU 11 includes a serial number detection portion 11a, an address setting portion 11b, and a setting changing portion 11c. Obviously it is not necessary that the CPU 11 be physically divided into these components, but the whole of the CPU 11 may fulfill functions played by the components. The serial number detection portion 11a simultaneously transmits a detection command for requesting predetermined one digit of the serial number to plurality of indoor units 21 to 24 while a position of the digit is changed in a predetermined order, and detects the serial number. The address setting portion 11b imparts the communication address to the indoor unit having the serial number detected by the serial number detection portion 11a. The setting changing portion 11c simultaneously transmits a changing command for changing a detection command recognizing method. Changing the detection command recognizing method is described in detail later.

When receiving the detection command from the serial number detection portion 11a through the receiving portion 212b, the CPU 211 responds to the detection command to transmit the digit of the serial number corresponding to the detection command through the transmitting portion 212a. When receiving the changing command from the setting changing portion 11c through the receiving portion 212b, the CPU 211 changes the detection command recognizing method.

The address setting operation of the air conditioner of the first embodiment will be described below with reference to FIGS. 3 to 5. In the following description, it is assumed that the serial number imparted to each of the indoor units 21 to 24 includes four digits, and it is assumed that the serial number is detected in the ascending order to set the communication address at each serial number.

Figure 3:
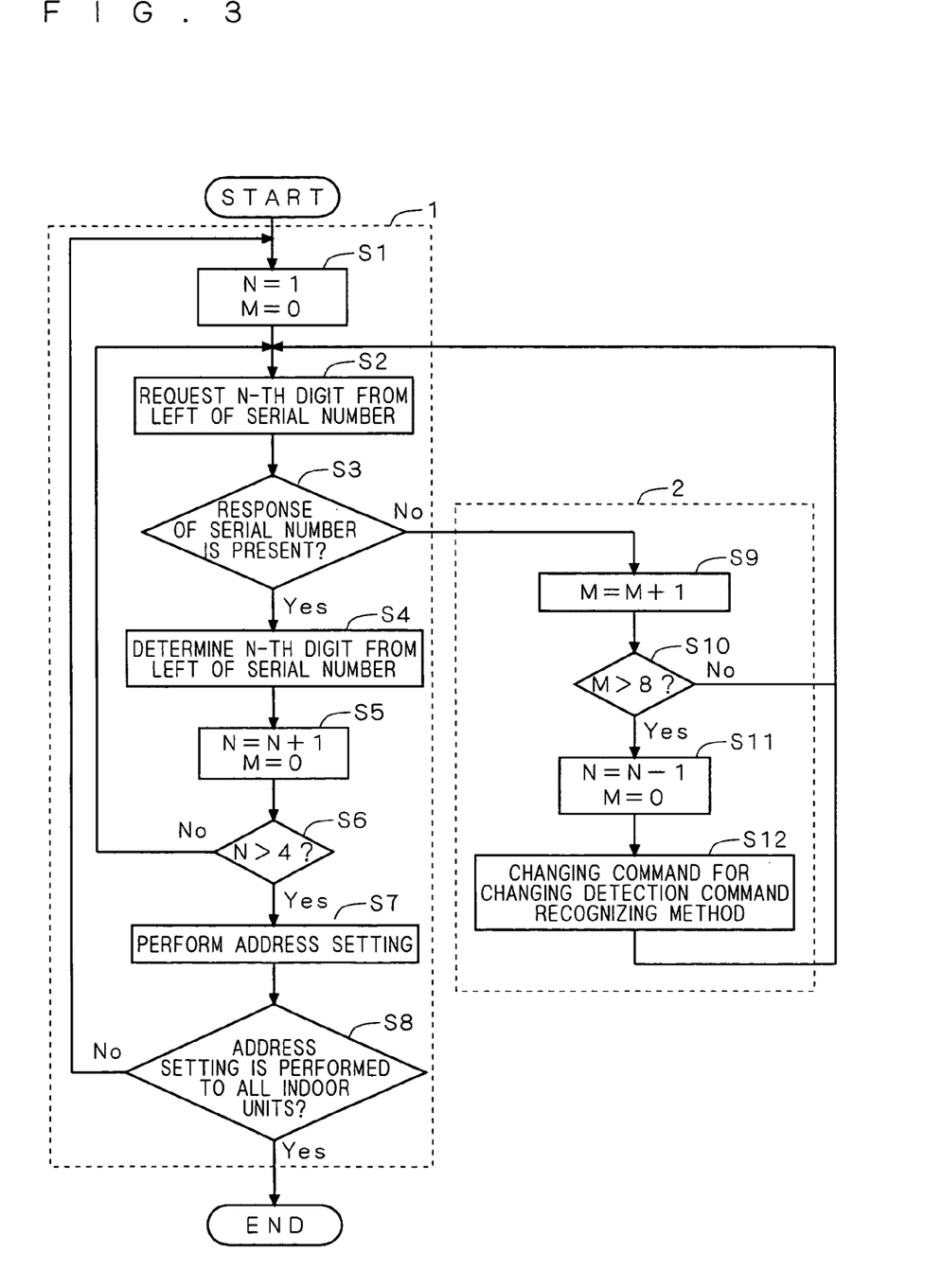
FIG. 3 is a flowchart showing an address setting operation of the air conditioner according to a first embodiment.
Figure 4:
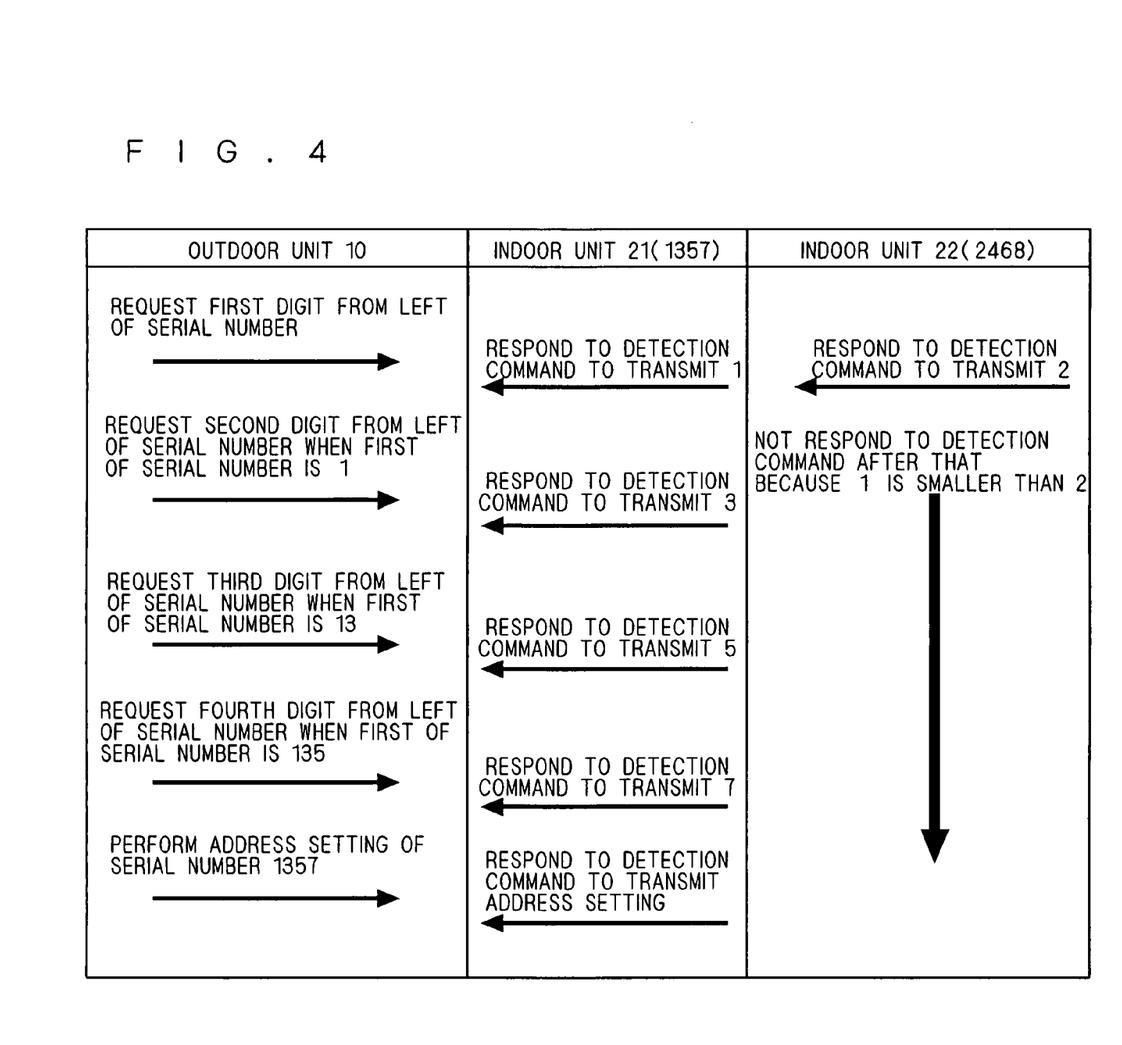
FIG. 4 is a view showing a detection command of the outdoor unit and a response of the indoor unit in a normal address setting.
Figure 5:
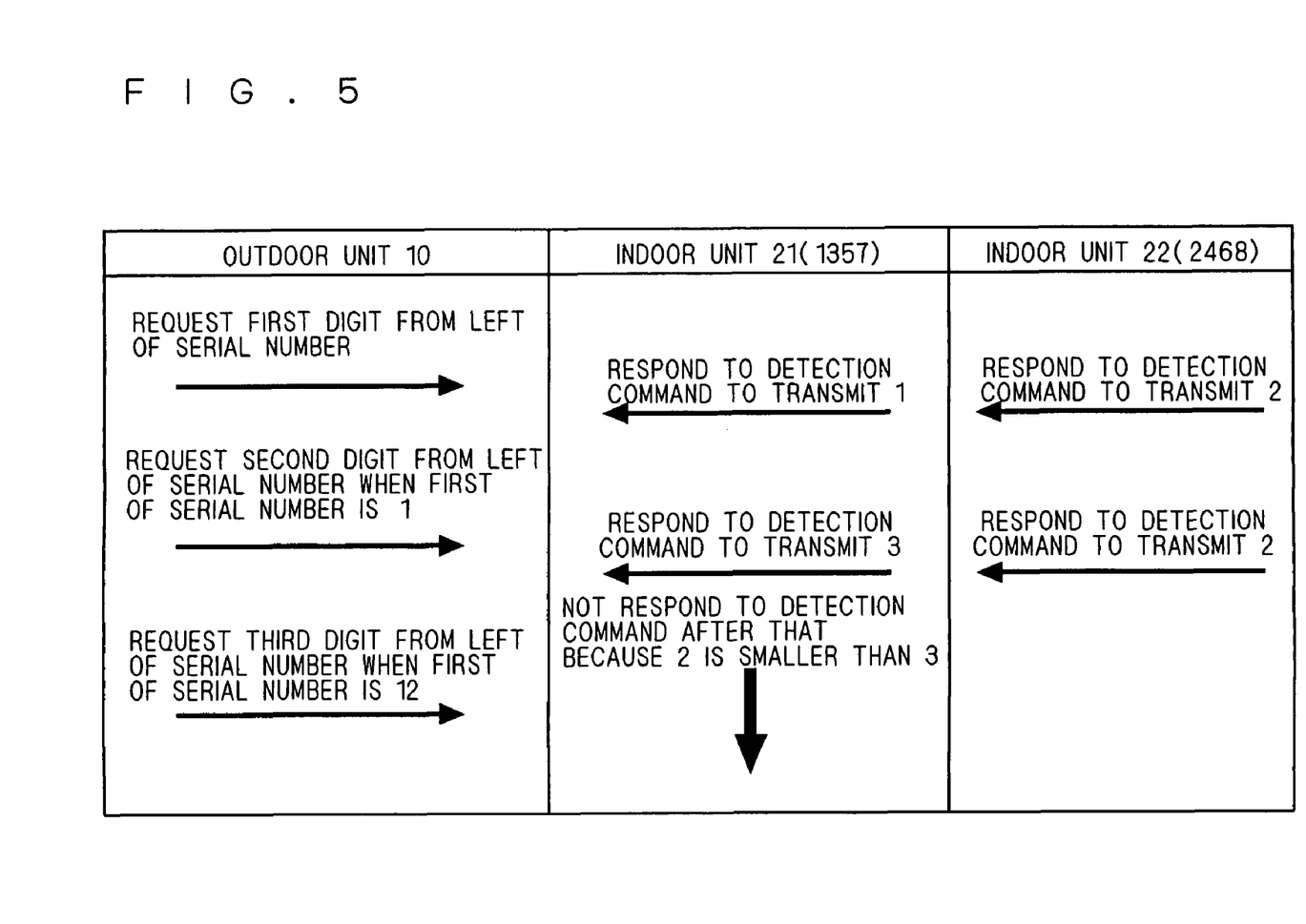
FIG. 5 is a view showing the detection command of the outdoor unit and the response of the indoor unit in the address setting when a trouble is generated.

FIG. 3 is a flowchart showing processing operations of the CPUs 11 and 211 during the address setting of the air conditioner, and FIGS. 4 and 5 are views showing a detection command of the outdoor unit 10 and responses of the indoor units 21 to 24. FIG. 4 shows the address setting operation in the normal operation, and FIG. 5 shows the address setting operation when a trouble is generated.

As shown in FIG. 4, the outdoor unit 10 simultaneously transmits the detection command for requesting the first digit from the left of the serial number to the plurality of indoor units 21 to 24. It is assumed that the serial numbers of the indoor units 21 and 22 are set at 1354 and 2468 respectively, and the serial numbers of the indoor units 23 and 24 are not described for the purpose of simple explanation.

When receiving the detection commands, the indoor units 21 and 22 respond to the detection commands to transmit the first digits from the left of the serial numbers respectively. The outdoor unit 10 determines that the first digit from the left of the serial number is 1 which is of the minimum value in the responses from the indoor units 21 and 22.

Then, the outdoor unit 10 specifies that 1 is the first of the serial number to be detected, and the outdoor unit 10 simultaneously transmits the detection command for requesting the second digit from the left of the serial number to the plurality of indoor units 21 and 22.

In the indoor units 21 and 22 which receive the detection commands, the indoor unit 22 does not respond to the detection command because the first of the serial number is not 1, but only the indoor unit 21 responds to the detection command to transmit 3. The outdoor unit 10 determines that the second digit from the left of the serial number to be detected is 3.

Then, the outdoor unit 10 specifies that 13 is the first of the serial number, and simultaneously transmits the detection command for requesting the third digit from the left of the serial number to the plurality of indoor units 21 and 22. Then, the serial number 1354 of the indoor unit 21 is detected by the similar operation.

Finally, the outdoor unit 10 imparts the communication address to the indoor unit 21 having the detected serial number 1354.

The CPUs 11 and 211 perform a processing operation shown in FIG. 3 in order to realize the above-described operation. In Step S1, the serial number detection portion 11a performs initialization to set N indicating a digit position from the left of the requesting serial number at 1, and performs initialization to set the number of repetitions M at 0. As used herein, the digit position N from the left shall mean the fourth digit of the serial number in the case of N=1, the third digit of the serial number in the case of N=2, the second digit of the serial number in the case of N=3, and the first digit of the serial number in the case of N=4.

In Step S2, the serial number detection portion 11a specifies the prior digits to (N−1)-th digit of the serial number that have been already decided, and the serial number detection portion 11a simultaneously transmits the detection command for requesting the N-th digit from the left of the serial number to the plurality of indoor units 21 to 24. However, in the case of N=1, the specification of the digit is not performed because information on the serial number to be detected is not obtained yet.

In Step S3, it is determined whether or not the response of the N-th digit from the left of the serial number is transmitted from any one of the indoor units 21 to 24.

In the case when the response is present as a result of determination in Step S3, it is determined in Step S4 that the N-th digit from the left of the serial number is the minimum value in the responses from the indoor units 21 to 24.

In Step S5, the digit position N from the left of the requesting serial number is updated by incrementing the digit position N by 1, and the number of repetitions M discussed below is initialized to 0.

In Step S6, it is determined whether or not the digit position N from the left of the requesting serial number is larger than 4. When the digit position N is smaller than 4, returning to Step S2 is conducted, and the next digit of the serial number is determined through Steps S2 to S7. When the digit position N is larger than 4, it is assumed that all the digits of the serial number are determined. In Step S7, the address setting portion 11b imparts the communication address to the indoor unit having the detected serial number.

In Step S8, it is confirmed whether or not the communication addresses are set at all the indoor units 21 to 24. When the communication addresses are set at all the indoor units 21 to 24, the ordinary running is started. When the communication addresses are not set at all the indoor units 21 to 24, returning to Step S1 is conducted, and the serial number is detected again. The indoor unit at which the communication address is already set does not return the serial number.

The address setting operation in the normal operation is performed as described above (processing surrounded by a broken line 1). However, when the signal of the detection command transmitted from the outdoor unit 10 is disturbed by the noise or ringing in Step S2, the indoor units 21 to 24 cannot normally recognize the detection command, and sometimes the indoor units 21 to 24 cannot transmit the normal response to the outdoor unit 10.

Figure 6A:
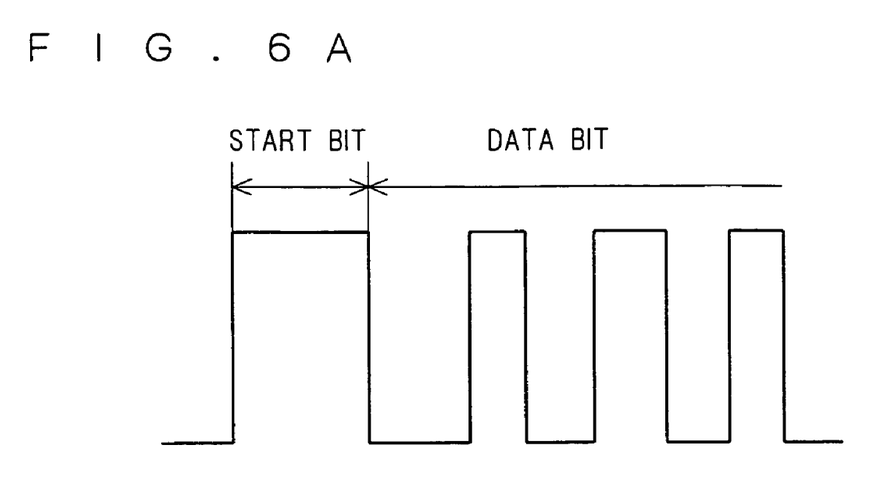
FIGS. 6A and 6B are views showing a signal (data) of the detection command.
Figure 6B:
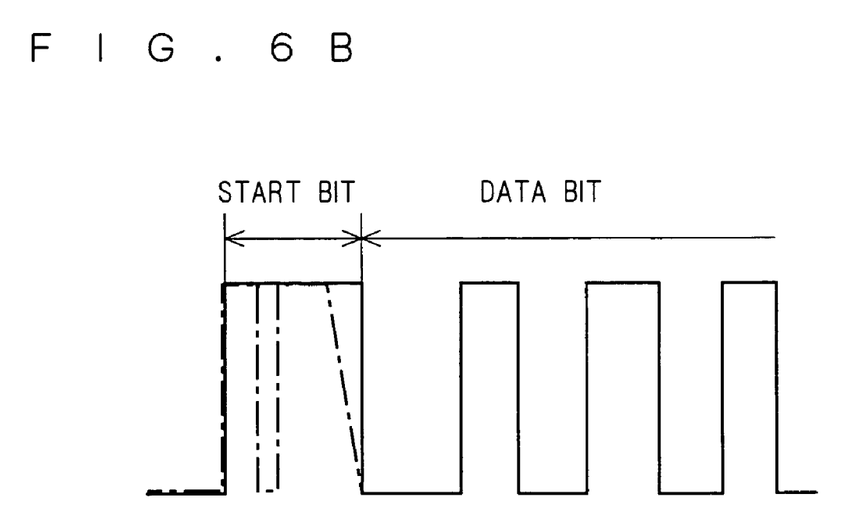

FIG. 6A illustrates a signal (data) specifically indicating the detection command, by an example. The detection command includes a start bit signal indicating a start position of a data bit and a data signal disposed subsequent to the start bit signal. The CPU 211 detects a width from rise of the signal to fall of the signal, and compares the width to a reference value to detect the start bit signal. However, as shown in FIG. 6B, when the noise or ringing or the like is generated in the start bit signal constituting the detection signal, the CPU 211 cannot normally detect the start bit signal, and cannot normally recognize the detection command.

The address setting trouble operation caused by the disturbance of the detection command signal will be described with reference to FIG. 5. Similarly to the case of FIG. 4, it is assumed that the serial numbers of the indoor units 21 and 22 are set at 1354 and 2468 respectively, and the serial numbers of the indoor units 23 and 24 are not described for the purpose of the simple explanation. It is assumed that the indoor unit 22 cannot normally recognize the detection command due to the signal disturbance in the indoor units 21 to 24.

The outdoor unit 10 simultaneously transmits the detection command for requesting the first digit from the left of the serial number to the plurality of indoor units 21 to 24. When receiving the detection commands, the indoor units 21 and 22 respond to the detection commands to transmit the first digits from the left of the serial numbers respectively. The outdoor unit 10 determines that the first digit from the left of the serial number to be detected is 1 which is of the minimum value in the responses from the indoor units 21 and 22.

Then, the outdoor unit 10 specifies that 1 is the first of the serial number to be detected, and simultaneously transmits the detection command for requesting the second digit from the left of the serial number to the plurality of indoor units 21 and 22.

When receiving the detection command, the indoor unit 21 responds to the detection commands to transmit 3. On the other hand, when the indoor unit 22 cannot normally recognize the detection command due to the noise, the CPU 211 mistakenly determined that the outdoor unit 10 is waiting for the response of the first digit, and the CPU 211 transmits the digit 2 which is already transmitted again. Therefore, the outdoor unit 10 determines that the second digit from the left of the serial number is 2 which is of the minimum value in the responses of the indoor units 21 and 22.

Then, the outdoor unit 10 specifies that 12 is the first of the serial number, and simultaneously transmits the detection command for requesting the third digit from the left of the serial number to the plurality of indoor units 21 and 22.

However, because the indoor unit of which the first of the serial number is 12 does not exist, the indoor units 21 and 22 do not respond to the detection command after that.

In the case where the address setting is interrupted by the trouble operation shown in FIG. 5, the air conditioner of the first embodiment starts over the address setting of FIG. 3 (processing surrounded by a broken line 3).

In the case when the response is absent as a result of determination in Step S3, the number of repetitions M is updated by incrementing the number of repetitions M by 1 in Step S9.

In Step S10, it is determined whether or not the number of repetitions M exceeds 8.

As a result of the determination in Step S10, when the number of repetitions M does not exceed 8, the flow returns to Step S2. For example, as shown in FIG. 6B, all the indoor units 21 to 24 do not temporarily recognize the detection command due to the signal disturbance of the detection command, and therefore the indoor units 21 to 24 do not respond to the detection command. In such cases, the address setting operation can return rapidly to the normal operation (processing surrounded by a broken line 1) by repeating the same processing (Step S2) predetermined number of times (in this case, eight times). However, the trouble is not solved by the above-described processing when the response is absent by the trouble operation shown in FIG. 5.

As a result of the determination in Step S10, when the number of repetitions M exceeds 8, that is, when the responses to all the detection commands of the eight times are absent, the digit position N from the left of the requesting serial number is updated by subtracting 1 from the digit position N and the number of repetitions M is initialized to 0 in Step S11. Then, returning to Step S2 is conducted through Step S12. In Step S2, the detection command for requesting the immediately preceding digit of the serial number is simultaneously transmitted to the indoor units 21 to 24.

That is, for the trouble with the address setting caused by the false response, the address setting does not start over from the first digit, but the address setting starts over from the immediately preceding digit. Accordingly, the time necessary for the address setting can be shortened.

In Step S12, the setting changing portion 11c simultaneously transmits the changing command for changing the detection command recognizing method to the plurality of indoor units 21 to 24, and returning to Step S2 is conducted. It is necessary that the CPU 211 normally recognize the detection command which is disturbed by the continuous noise or ringing more securely. Therefore, the detection command recognizing method is changed as follows.

That is, temporal resolution is lowered in detecting the width of the active period which becomes a reference of the presence or absence of the start bit signal. For example, the active period of the signal included in the predetermined width from the rise of the signal is detected, and the active period is compared with a reference value to detect the start bit signal. Accordingly, the false recognition of the detection command caused by the noise or ringing or the like can be constrained, and the address setting can more securely start over.

Thus, in the case where the trouble is generated by the false recognition of the detection command during the address setting, the address setting starts over from the immediately preceding digit of the serial number, so that the time necessary to perform the address setting again can be shortened. The address setting starts over by changing the detection command recognizing method. Therefore, even if the noise or ringing or the like is generated, the normal recognition of the detection command is easily performed, and the address setting can more securely start over.

Second Embodiment

An air conditioner according to a second embodiment of the present invention will be described below. A configuration of the air conditioner of the second embodiment is identical to that of the air conditioner of the first embodiment shown in FIGS. 1 and 2.

In the case where the detection command recognizing method has a good track record in the market, it is not preferable to simply change the detection command recognizing method. Therefore, in the second embodiment, when the indoor units 21 to 24 do not respond to all the detection commands of eight times, the detection command recognizing method is not changed, but the address setting starts over from the immediately preceding digit. In the second embodiment, the detection command recognizing method is changed only when the address setting starts over by returning to the first digit of the serial number.

Figure 7:
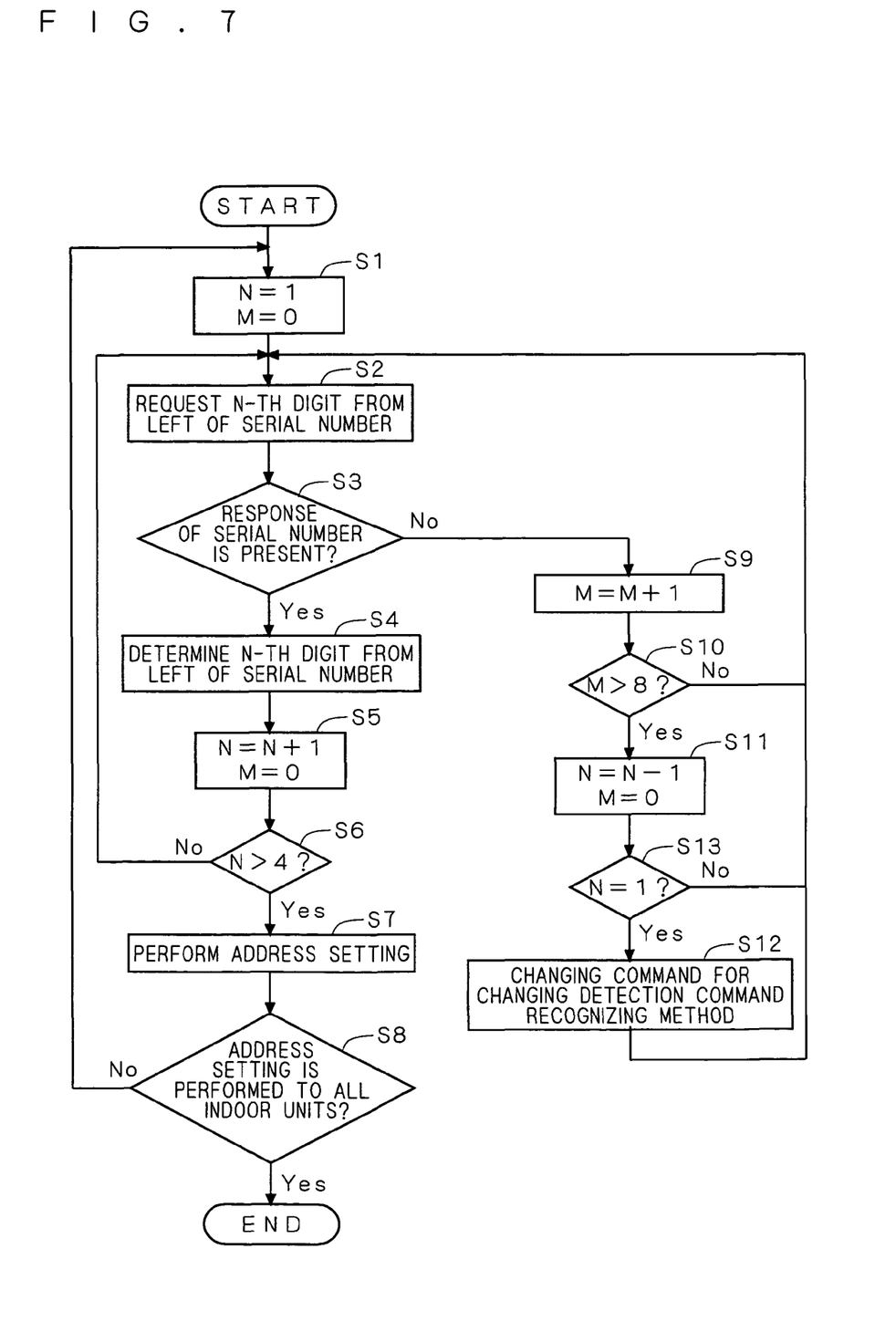
FIG. 7 is a flowchart showing an address setting operation of an air conditioner according to a second embodiment.

The address setting operation of the air conditioner of the second embodiment will be described with reference to a flowchart of FIG. 7. The same or corresponding component is designated by the same numeral, and the overlapping description is not repeated. That is, the address setting operation of the second embodiment differs from that of the first embodiment in that Step S13 is performed between Step S11 and Step S12.

In Step S11, the digit position N from the left of the serial number is updated by subtracting 1 from the digit position N. In Step S13, it is determined whether or not the digit position N from the left of the serial number is 1.

As a result of the determination in Step S13, returning to Step S2 is conducted when the digit position N from the left of the serial number is not 1, and returning to Step S2 is conducted through Step S12 when the digit position N from the left of the serial number is 1.

That is, for example, any one of the indoor units 21 to 24 does not temporarily normally recognize the detection command due to the accidental signal disturbance of the detection command, and therefore the operation failure is generated as shown in FIG. 5. In such cases, the address setting operation can normally start over from the immediately preceding digit without changing the detection command recognizing method. For example, one of the indoor units 21 to 24 does not continuously normally recognize the detection command due to the continuous signal disturbance of the detection command, and therefore the operation failure is generated as shown in FIG. 5. In such cases, the address setting operation can securely start over by changing the detection command recognizing method when the address setting operation starts over from the first digit.

In the embodiments, the digit of the serial number is described in terms of the decimal system. Alternatively, the digit of the serial number may be described in terms of the binary system. That is, the outdoor unit may request the serial number of the indoor unit in each bit.

In the embodiments, the first digit from the left of the serial number to be detected is sequentially requested one by one. However, the invention is not limited to the embodiments. For example, the first digit from the right of the serial number may be requested one by one, or the digit may be requested from the middle of the serial number. The plural digits may be detected.

Although the invention is described in detail above, the description is made only by way of example, and the invention is not limited to the description. It is to be understood that various modifications which are not illustrated can be made without departing from the scope of the invention.

The invention claimed is:

1. An air conditioner in which one control portion and a plurality of indoor units are connected to each other through a communication line and running is controlled by conducting communication between said control portion and said plurality of indoor units based on a communication address corresponding to each of said plurality of indoor units,
   wherein each of said plurality of indoor units includes a transmitting portion and a receiving portion, said receiving portion receiving detection commands that each requests a different one of digits of a unique indoor unit identification number from said control portion through said communication line, said transmitting portion transmitting a response including the identification number digit that corresponds to the detection command through said communication line,
   said control portion includes:
   an identification number detection portion which repeatedly transmits, in a predetermined order said detection commands to said plurality of indoor units, a position of said identification number digits being changed for the repeatedly transmitted detection commands, and detects said identification number; when no response to a first detection commands of said detection commands is received, said identification number detection portion simultaneously transmits to said plurality if indoor units a second detection command of said detection commands that immediately precedes said first detection command of said detection commands based on said predetermined order; and
   an address setting portion which imparts said communication address to one of said plurality of indoor units having said identification number detected by said identification number detection portion.

2. The air conditioner according to claim 1, wherein said identification number detection portion simultaneously transmits the same first of said detection commands to said plurality of indoor units a predetermined number of times repeatedly, and
   said identification number detection portion simultaneously transmits said second of said detection commands to said plurality of indoor units, when no response to every first of said detection commands is received.

3. The air conditioner according to claim 1, wherein said control portion further includes a setting changing portion which simultaneously transmits a changing command for changing a method of recognizing said detection commands to said plurality of indoor units.

4. The air conditioner according to claim 2, wherein said control portion further includes a setting changing portion which simultaneously transmits said changing command for changing said method of recognizing said detection commands to said plurality of indoor units when no responses to every first of said detection commands is received, and then said identification number detection portion simultaneously transmits said second of said detection commands to said plurality of indoor units.

5. The air conditioner according to claim 2, wherein said control portion further includes a setting changing portion which simultaneously transmits said changing command for changing said method of recognizing said detection commands to said plurality of indoor units only when said second of said detection commands is an initial one in said predetermined order and, at the same time, when no responses to every first detection commands is received, and then said identification number detection portion simultaneously transmits said second of said detection commands to said plurality of indoor units.

6. The air conditioner according to claim 3, wherein changing said method of recognizing said detection commands is that temporal resolution in which a width of an active period is detected is decreased, said width of said active period becoming a reference of presence or absence of a start bit signal indicating a data start position of each of said detection commands.

7. The air conditioner according to claim 4, wherein changing said method of recognizing said detection commands is that temporal resolution in which a width of an active period is detected is decreased, said width of said active period becoming a reference of presence or absence of a start bit signal indicating a data start position of each of said detection commands.

8. The air conditioner according to claim 5, wherein changing said method of recognizing said detection commands is that temporal resolution in which a width of an active period is detected is decreased, said width of said active period becoming a reference of presence or absence of a start bit signal indicating a data start position of each of said detection commands.

9. An address setting method in an air conditioner in which one control portion and a plurality of indoor units are connected to each other through a communication line and running is controlled by conducting communication between said control portion and said plurality of indoor units based on a communication address corresponding to each of said plurality of indoor units;
  each of said plurality of indoor units includes a transmitting portion and a receiving portion, said receiving portion receiving detection commands that each requests a different one of digits of a unique indoor unit identification number, from said control portion through said communication line, said transmitting portion transmitting a response including, the identification number digit that corresponds to the detection command through said communication line, and
  said control portion includes:
    an identification number detection portion which repeatedly transmits, in a predetermined order said detection commands to said plurality of indoor units, a position of said identification number digit being changed for the repeatedly transmitted detection commands, and detects said identification number; and
    an address setting portion which imparts said communication address to one of said indoor units having said identification number detected by said identification number detection portion, and
  wherein said identification number detection portion performs:
    (a) a step of simultaneously transmitting a first detection command of said detection commands to said plurality of indoor units, and
    (b) a step of simultaneously transmitting to said plurality of indoor units a second of said detection commands that immediately precedes said first of said detection commands based on said predetermined order, when no response to said first of said detection commands is received.

10. The address setting method in the air conditioner according to claim 9, wherein said step (a) is a step of simultaneously transmitting the same first of said detection commands to said plurality of indoor units a predetermined number of times repeatedly, and
  said step (b) is a step of simultaneously transmitting said second of said detection commands to said plurality of indoor units, when no response to every first of said detection commands is received.

11. The address setting method in the air conditioner according to claim 9, wherein said control portion further performs a step (c-1) between said step (a) and said step (b), in said step (c-1) a changing command for changing a method of recognizing said detection commands is simultaneously transmitted to said plurality of indoor units when no responses to every first detection commands is received.

12. The address setting method in the air conditioner according to claim 10, wherein said control portion further performs a step (c-2) between said step (a) and said step (b), in said step (c-2) a changing command for changing a method of recognizing said detection commands is simultaneously transmitted to said plurality of indoor units, only when said second of said detection commands is an initial one in said predetermined order and, at the same time, when no responses to every first of said detection commands received.

13. The address setting method in the air conditioner according to claim 11, wherein, in said step (c-1), changing said method of recognizing said detection commands is that temporal resolution in which a width of an active period is detected is decreased, said width of said active period becoming a reference of presence or absence of a start bit signal indicating a data start position of each of said detection commands.

14. The address setting method in the air conditioner according to claim 12, wherein, in said step (c-2), changing said method of recognizing said detection commands is that temporal resolution in which a width of an active period is detected is decreased, said width of said active period becoming a reference of presence or absence of a start bit signal indicating a data start position of each of said detection commands.

15. The air conditioner according to claim 2, wherein said control portion further includes a setting changing portion which simultaneously transmits a changing command for changing a method of recognizing said detection commands to said plurality of indoor units.

16. The air conditioner according to claim 15, wherein changing said method of recognizing said detection commands is that temporal resolution in which a width of an active period is detected is decreased, said width of said active period is detected is decreased, said width of said active period becoming a reference of presence or absence of a start bit signal indicating a data start position of each of said detection commands.

* * * * *